United States Patent Office 3,674,373
Patented July 4, 1972

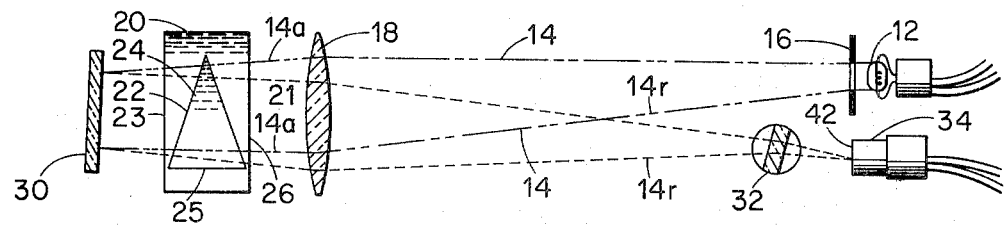
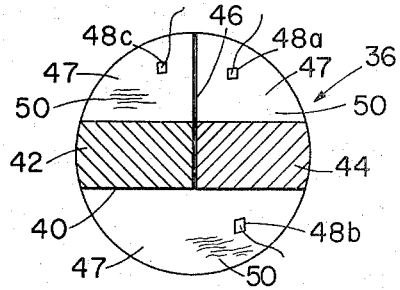
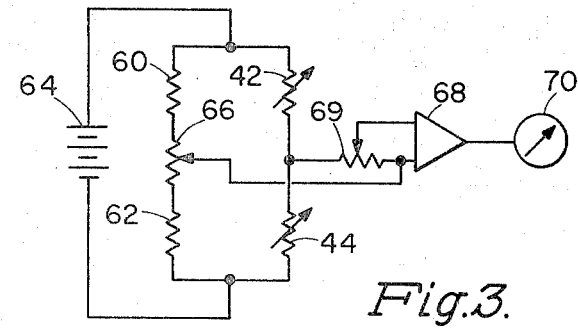
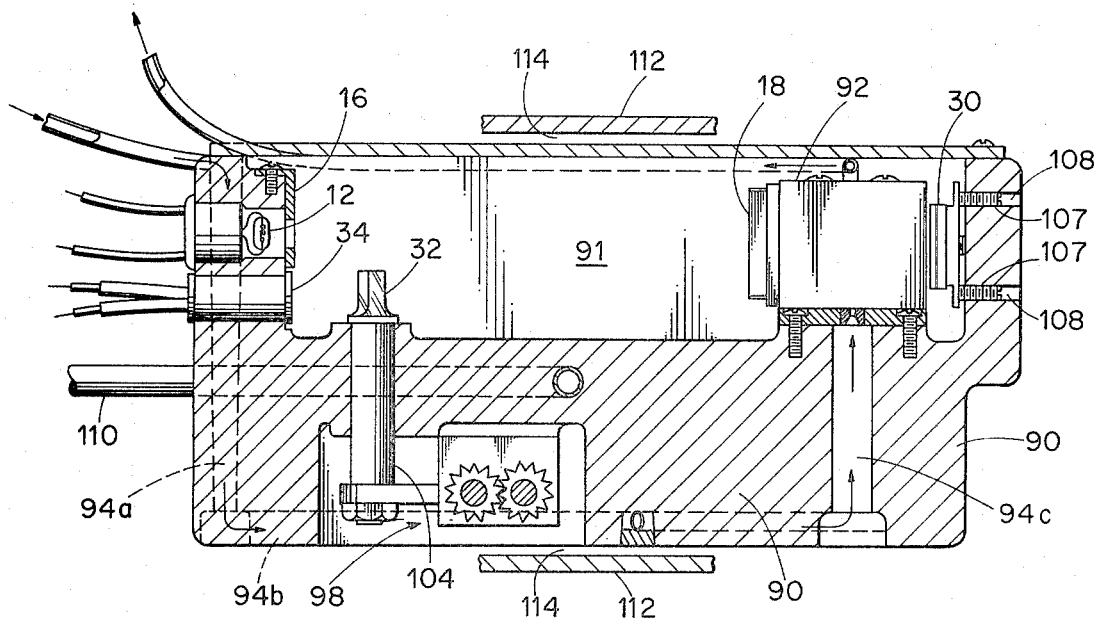

3,674,373
DIFFERENTIAL REFRACTOMETER
James L. Waters, Framingham, Louis Abrahams, Worcester, and Burleigh M. Hutchins, Jr., Framingham, Mass., assignors to Waters Associates, Inc., Framingham, Mass.
Filed Feb. 2, 1970, Ser. No. 7,959
Int. Cl. G01r *21/46*
U.S. Cl. 356—130       17 Claims

ABSTRACT OF THE DISCLOSURE

A differential refractometer characterized by the use of a massive metallic optical bench comprising a recessed compartment for holding and thermally shielding the optical components thereof. The optical bench comprises a novel heat exchanger whereby improved peak-resolution and temperature control of sample liquid are attained simultaneously. This improvement is achieved by keeping successive segments of a sample inlet tube buried within the block and thermally insulated one from another. An improved and simplified light source contributes to the low cost and overall thermal stability of the instrument.

BACKGROUND OF THE INVENTION

(A) Field of the invention

The invention relates to an improved differential refractometer, e.g. of the type useful in identifying chemical constituents of mixtures which have been passed through chromatographic fractionating columns.

(B) The prior art

The measurement of the refractive index of chemical compounds by instruments known as refractometers has been known for many years. More recently it has become one of the most valuable methods of identifying closely-related chemical compounds which relatively recent advances in the chemical arts have made separable and, therefore, separately identifiable.

There are two primary types of refractometers, the critical angle type and the image-bending, i.e., image-displacement, types. The critical angle refractometer is the oldest instrument known. Such refractometers are usually referred to as the Pulfrich or Abbe type refractometers and utilize a mechanism whereby a convergent beam of light strikes the surface between an unknown sample, of index $n$, and a prism of know index $n'$. The beam of light is so oriented that some of its rays graze the surface thereof at the critical angle. This causes some of the light rays to be carried down through the prism and to impinge on a predetermined target; thus one observes, in the transmitted light, a sharp boundary between light and dark. Measurement of the angle at which the light is transmitted through the prism determines the exact placement of this boundary and allows one to compute the value of the critical angle and hence of the refractive index $n$.

The image displacement type of refractometer utilizes a mechanism where a beam of light is bent by a wedge-shaped sample of material being measured.

Each of the above types of refractometers have been made to operate more accurately by the measurement of the differential indices of refraction between two sample fluids (one the unknown, the other a reference of known refractive properties) in such a way as to greatly increase the accuracy of the measurements which can be obtained. Such refractometers are called differential refractometers. In general, those refractometers which do not operate on a differential principle are not sensitive beyond $10^{-4}$ to $10^{-5}$ refractive index units. When operated under ideal conditions, differential refractometers can be sensitive to $10^{-7}$ to $10^{-8}$ refractive index units.

Excellent temperature control is essential in refractometers of the differential type. The angles at which light refracts on being passed through liquid is, all other things being equal, proportional to the number of molecules per unit of liquid volume. Since organic liquids may show on the order of 1000 parts per million increase in volume for each 1 C.° increase in temperature, it is obvious that even small changes in temperature can cause severe changes in the number of molecules contained in a given volume.

It is also necesary to assure, in the operation of a sensitive refractometer, that the sample liquid being supplied to the refractometer cell does not manifest any temperature fluctuation which may be imparted to the liquid before it reaches the refractometer. That is to say that the refractometer operator should assume some unacceptable differences in sample input temperature will be experienced and the instrument should incorporate means for thermally conditioning this fluid. And, of course, this thermal conditioning means adds another factor to the temperature-controlling problems associated with the operation of a differential refractometer.

Another problem associated the condition in which the sample liquid reaches the refractometer cell, and contributing to the complexity of the design problems associated with refractometers, is the problem of "peak-spreading."

Peak-spreading obtains its name from the phenomena witnessed on a recording chart whereby a given chemical constituent which enters the refractometers over a relatively short period of time is sensed by the instrument over a significantly longer period of time. Thus the recording chart has a less sharp peak than is theoretically possible. This lack of sharpness or "spreading" of the peak is a material limitation in interpreting the data obtained by continuous-sampling refractometers.

Heretofore refractometers which have included significantly useful means for thermally conditioning sample liquid, have also tended to exhibit excessively peak-spreading characteristics. This peak-spreading has largely been due to excessive mixing or stratification of the sample liquid in the thermal conditioning means between the time it enters the refractometer and the time it enters the refraction cell.

The use of larger light bulbs, i.e. those dissipating several watts of power at the optical bench, have usually made it necessary to provide external cooling means for the refractometer. Some refractometers have utilized a large heat sink which acts as a fin cooled by convection currents; some have used forced air cooling; many have used water cooling means. Such devices to the size, complexity, and expense of the apparatus; moreover, they introduce a new thermal effect which must be carefully controlled and—very often—balanced by further temperature control means.

In summation then, the inventors have been faced with the need to diminish the effect of environmental temperatures, diminish the effect of the waste heat provided to the system by the light source while simultaneously giving the proper thermal-conditioning to sample liquid being fed into the refractometer cell.

Attempts to solve these problems by previous inventors have consistently led to refractometers of increasing cost and complexity.

SUMMARY OF THE INVENTION

Therefore it is an object of the invention to provide a more economical, less complex, yet highly-sensitive refractometer.

Another object of the instant invention is to provide an improved differential refractometer of the image-displacement type with high sensitivity, but of relatively simple construction.

It is another object of the invention to provide a novel refractometer utilizing a small, but very stable, power source.

Another object of the invention is to provide temperature stabilizing means integrated with the optical bench of the refractometer which stabilizing means not only provides stabilization against temperature fluctuation in the environment of the apparatus, but also forms means to thermally condition the sample fluid without excessive stratification of the sample fluid.

Still another object of the invention is to provide a refractometer using a light source which not only allows simplification of the design of the refractometer, but also generates less thermal interference than light sources used in prior art refractometers.

Still another object of the invention is to provide a novel integral construction wherein the various advantages of the refractometer of the invention are combined in advantageous relationship with one another to produce an exceptional instrument.

Another object of the invention is to provide a novel process for stabilizing a differential refractometer.

The above objects have been substantially achieved by the construction of a novel refractometer of the differential type which utilizes, as a temperature-conditioning means, a massive metallic optical bench onto which the optical components are fastened and in which the optical system is largely enclosed. This optical bench contains a heat exchanger therein which, surprisingly, combines highly-thermal conditioning of the sample fluid with excellent peak resolution.

The metallic optical bench, which is advantageously at least five inches in length, functions in a plurality of ways. Its mass, at least above five pounds but advantageously ten pounds or more, serves as a rugged integral optical bench which has enough thermal capacity to effectively moderate the effect of transient environmental temperature changes on the optical components held within a channel in the bench; this effect is obtained under all normal conditions without the use of any auxiliary cooling or heating means.

The massive metallic optical bench also provides a heat-absorbing mass for thermally-conditioning the sample liquid as it is brought into the apparatus. But the configuration of the channel in the optical bench through which the sample liquid flows has been found to be very important if optimum peak resolution and thermal conditioning are to be achieved concurrently.

A particular advantage achieved by use of an elongate filament as a light source is the relatively small amount of thermal energy generated thereby. With conventional light sources, i.e. those lamps which are utilized in conjunction with an elongate slit, about 6 to 10 watts of heat is commonly generated and thermal isolation of such a source is impossible.

Applicants have discovered that, by using a single filament-type bulb with a thermal output of less than two watts, the slit and consequent slit-to-source alignment problems are avoided: moreover, the thermal effect on the apparatus is minimized and the advantages of using the massive metallic optical bench described above are maximized.

The elimination of heat generated by lamps utilized in the prior art devices makes it relatively easy to maintain the apparatus at constant temperature and below the point at which small air bubbles tend to come out of solution in the liquids being analyzed. Such air bubbles have heretofore been a major stumbling block in carrying out many analytical procedures with refractometers. However, the present invention provides means to dissipate the heat from the lamp without having a temperature rise of over about 5° C. and without an excessive heat path to environment.

Surprisingly, it has been discovered that usual heat-exchanger configurations—i.e. coils, and other such configurations designed to maximize heat-transfer area—are undesirable. What is necessary in order to achieve optimum thermal control is that heat-exchanging conduits buried within the block be so positioned that each increment of said conduit is substantially isolated from heat transferred through the block to or from any other increment of the conduit. This condition is notoriously absent in conventional heat-exchanger designs which have been used in refractometers.

Thus tight helical coils or U-tubes, are usually not acceptable because of the thermal "short-circuiting" of the fluid carried therein through the heat-conductive block. Although thermal short-circuiting could be avoided by use of an insulating barrier placed about the heat-exchanger conduit, this would be detrimental both (1) to the use of the heat-conductive block as a temperature-conditioning means for a sample, and (2) to the use of the conduits within the block as heat-exchanger means.

Precise design limitations of the heat-exchanger must be determined with respect to size of the conduits and temperature and flow rate of the liquid contained therein. Refractometers which have optimum characteristics over the broadest range of conditions have conduit systems whose sequential segments are maintained remote by at least one inch of aluminum (or a thermal resistance equivalent thereto) from one another straight segments of conduit are ideal. If, as in the usual case, these segments are connected sequentially it is advantageous, that the joinder be at an angle from 60° to 180°.

It will be obvious to those skilled in the art that the discovery that a relatively short, straight inlet tube for sample liquid is more effective than the S-type and coil-type tubes is of major importance in that it allows less expensive apparatus design. However, as important, it eliminates the dilemma thought to exist between designing an apparatus capable of achieving good thermal conditioning of the sample liquid and designing an apparatus capable of achieving high peak resolution.

The conduit in which the sample liquid is conducted through the massive metallic optical bench to the refracting cell is at least two inches long, preferably six inches long or more. The diameter of the conduit is usually selected with respect to the pressure with which the sample fluid will be delivered to the refractometer.

It should be clear that, because a short section of straight tubing can perform well, small sections of coiled tubing, S-shaped tubing, and the like can be included in the conduit without unduly regressive heat-exchanging effects. Thus inclusion of minor sections of such conventional configurations in a heat-conditioning conduit which consists of a major portion of straight tubing of the type described should be recognized as an attempt to obtain some benefits of the instant invention at the sacrifice of a part of the benefit achievable therewith.

Some advantages of constructing an image-displacement refractometer that can utilize a single integral sensing unit is manifest: one avoids both the expense of a second sensing unit, the complexities of construction required to properly place two units with respect to each other and the complexities of construction required to split a light beam. Other and even more important advantages, however, have been discovered in that different aging characteristics of different sensing units is no longer a problem; and the properly-balanced thermal environment, which can be extremely difficult to maintain when two necessarily-spaced sensing units must be used, may be more easily maintained.

ILLUSTRATIVE EMBODIMENTS OF THE INVENTION

In this application and accompanying drawings we show and describe a preferred embodiment of our invention and suggest various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

In the drawings:

FIG. 1 is a schematic diagram showing the relationship between the various elements included within the apparatus which influence, and are influenced by, light used in operation of the apparatus.

FIG. 2 is a plan view of the face of a photosensitive device useful in construction of the apparatus of the invention.

FIG. 3 is a schematic representation for an electrical circuit which may be used in the refractometer of the invention.

Figure 5:
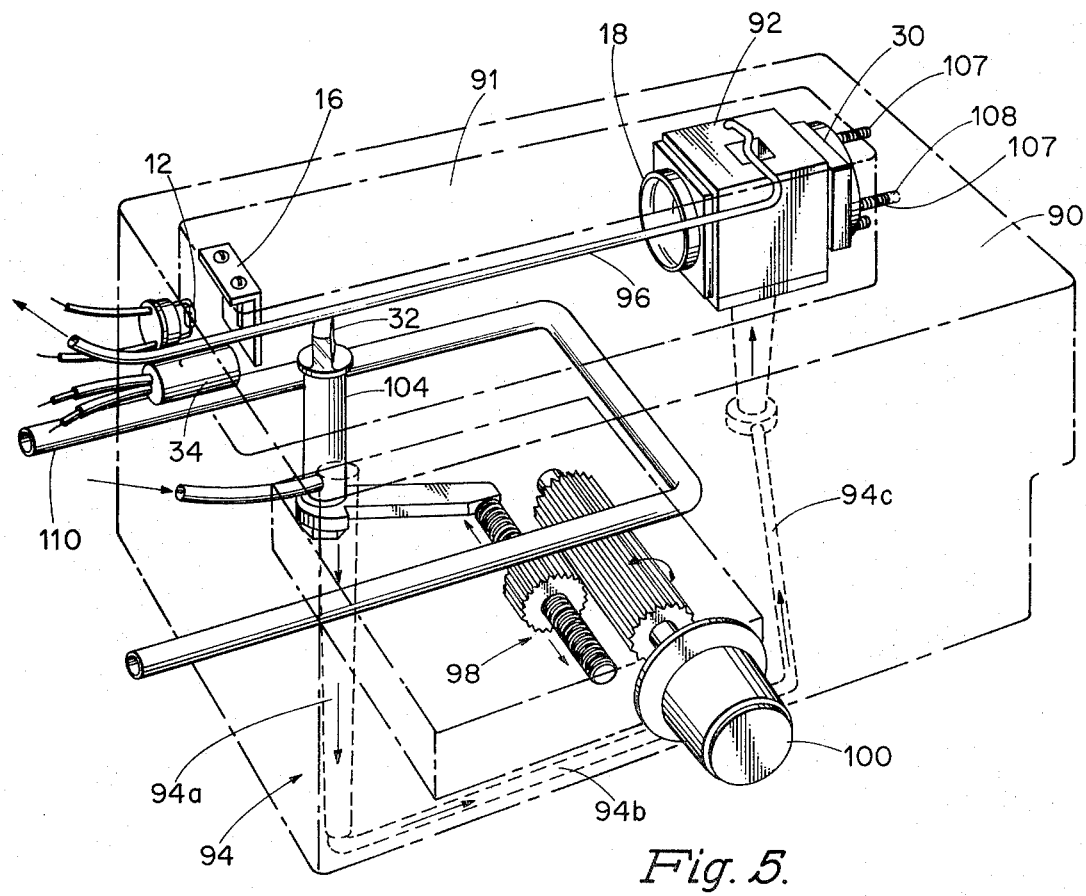

FIG. 4 and FIG. 5 are views of a particularly advantageous embodiment of the invention wherein all the elements thereof are included within a single block adapted to provide a stable thermal environment for the apparatus. FIG. 4 is a section of the block; FIG. 5 is a perspective view with the block outlined in phantom.

Referring to FIG. 1 there is seen a filament bulb 12, an axial-lead lamp rated at 5 volts sold under the trade designation P/N 7154 by Hudson Lamp Company of Kearny, N.J., and operated at about 1 watt, which emits visible light of polychromatic character. The beam 14 from this light source passes through a mask 16. Mask 16 performs no beam shape-defining function, but merely serves to prevent extraneous light from pervading the optical system of the apparatus.

After passing through a light-collimating lens 18, the beam 14 emerges with parallel rays as beam 14a and enters refracting member 20. Refracting member 20 has parallel windows 21 and 23 which are in the path of beam 14a. Refracting member 20 contains a hollow prism 22 arranged to receive reference liquid 24 of known refractive index. Prism 22 is positioned so that its base 25 is parallel to the collimated beam 14a. There is a conduit 26 in member 20, said conduit being defined by the inner wall of member 20, and the outer wall of prism 22. Through conduit 26 flows, in a normal continuous analysis operation, that sample liquid whose index of refraction is to be determined.

As is shown in FIG. 1, collimated light beam 14a from collimating lens 18 passes through refracting member 20 a first time, passing through windows 21 and 23, respectively: then the light beam is reflected from a mirror 30 so as to pass again through refracting member 20, thereby to double the angular displacement imparted to the beam by the initial passage through refracting member 20.

Twice-refracted beam 14r emerges from refracting member 20 and passes through a calibration deflector plate 32. Deflector 32 is adapted to move the light beam laterally without otherwise affecting it so that, on its being adjusted properly, refracted light beam 14r can pass through deflector 32 and be zeroed properly on photocell 34.

Photocell 34 comprises as the light-receiving element thereof, the light detector face 36 shown in FIG. 2.

FIG. 2 shows detector face 36 comprising a photosensitive strip 40 divided into two photosensitive transducers, 42 and 44, by a dividing line 46 which is free of any conductive material. Transducers 42 and 44 are formed of a photosensitive material such as cadmium sulfide and are bonded to a substrate formed of a dielectric material of the type generally known in the art. The three areas 47 of detector face 36 which are not covered by photosensitive material have electrodes 48a, 48b and 48c attached thereto and are covered by a thin conductive metallic coating 50.

Ideally, when the single coherent light beam 14r falls on transducers 42 and 44 in such a way that the electrical conductivity of each transducer is the same, the apparatus can be considered balanced or zeroed and the resistance between electrodes 48b and 48c will equal the resistance between 48b and 48a. However as the beam is deflected, for example to the left so that the light-sensitized path between 48b and 48c decreases while the light-sensitized path between 48b and 48a increases, both transducers 42 and 44 act as variable resistances. It is the quantitative measurement of these variable resistances which is used to identify precisely that degree of refraction which the light beam experienced on its two-way trip through refracting member 20.

Thus, with reference to FIG. 3, a circuit is illustrated which provides an output indication corresponding to the monitored index of refraction of the sample flowing through conduit 26. The photosensitive transducers 42 and 44 are connected, as shown, in a bridge circuit with resistors 60 and 62. Energy is provided to the circuit by battery 64 and the output, i.e. the unbalance voltage of the bridge, is taken from the junction of transducers 42 and 44 and the tap of a potentiometer 66 connected between resistors 60 and 62. The unbalance voltage is passed through a second potentiometer 69 to an amplified 68 and the output of the amplifier is registered on a meter 70. The bridge load, including the potentiometer 69 preferably has an impedance substantially greater than the internal impedance of the bridge, so as to have negligible effect on the unbalance voltage.

FIGS. 4 and 5 show a refractometer constructed according to the foregoing invention rigidly intergrated into a unitized block of metal which forms a base capable of being maintained in a substantially constant thermal condition. Referring to FIGS. 4 and 5, it is seen that massive metallic aluminum block 90 comprises a recessed compartment 91 molded thereinto and, mounted at one end of recessed compartment 91, a cell assembly 92 which is adapted to hold the components of refracting member 20 as seen in FIG. 1. A collimating lens 18 is mounted in front of cell assembly 92 and a reflecting mirror 30 is mounted therebehind. Sample inlet tube 94 and sample outlet tubes 96 are used to supply a stream of sample fluid to a conduit 26 within cell assembly 92. These tubes, exaggerated in size in the drawings, are usually from 0.010 to 0.25 inch in inside diameter.

At the opposite end of recessed compartment 91 is a filament bulb 12. A deflector plate 32 is mounted within recessed compartment 91 between bulb 12 and cell assembly 92. Deflector plate 32 is rotatably mounted for adjustment by manual adjusting means 98 (see FIG. 6) mounted just outside of block 90. The manual adjusting means comprises a zero screw 100, a drive arm assembly 102 which is a means of desensitizing the drive arm so that small angular adjustments of lens 32 can be made manually, and an adjusting arm 104 which is directly linked to defector plate 32 through a shaft 106 in block 90.

Mirror adjusting screws 107 are mounted through shaft 108 for operable connection with reflecting mirror 30.

Thus it is seen that all parts of the refractometer apparatus are snugly incorporated within block 90.

Particular attention is called to the right-angular design and the placement of tube 94 in an aluminum block 90. Each segment 94a, 94b and 94c of tube 94 is positioned to be thermally isolated one from another. This feature is important when minimizing the thermal variations in sample fluid which is temperature conditioned within the block before being admitted to conduit 26 in refracting member 20. Sample fluid leaves block 90 through a tube 96.

An optional heating or cooling conduit 110 is provided so that the apparatus may be brought to particularly low or high temperature when an especially temperature-sensitive material is to be analyzed.

The entire apparatus described above is conveniently mounted in a casing 112 which provides sufficient dead-air space 124 to protect block 90 against convection currents in the environment.

Figure 6:
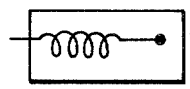
Figure 7:
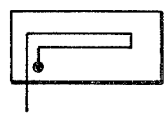
Figure 8:
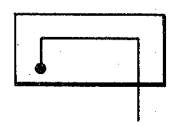

FIGS. 6, 7 and 8 illustrate schematically several heat exchanger configurations which illustrate the invention relating to the sample conditioning tube. In each illustrated case, the tube is 0.040 inch in average diameter. In the case of the situation illustrated in FIG. 6, the tubing is slightly flattened to facilitate the coiling thereof; in other illustrated cases, the tubing is round.

A test was run whereby 3.2 cc. per minute of separate samples of a sample liquid control were passed through each of the illustrated heat exchangers under equilibrium conditions so that a recorder scale reading of a refractive index was constant.

Then an ice cube was placed on a simple conduit just before it entered the massive metallic block. The response of the reading on the recorder to this external cooling was taken as an inverse measure of the effectiveness of the heat exchanger buried within the optical bench. The following date were obtained:

| Heat exchanger used | Description | Percent change in recorder scale |
| --- | --- | --- |
| Figure 6 | Coiled and three feet in length | 5.7 |
| Figure 7 | Ten inches long, but segments in proximity | 3.0 |
| Figure 8 | Seven inches long, and segments remote | 0.5-1.0 |

Thus it is seen that the better results are obtained with the shortest of the heat exchangers because that heat exchanger is carefully laid out to avoid the thermal short-circuiting of the sample flowing therein. Thermal short-circuiting occurs in both of the exchangers schematically illustrated in FIGS. 6 and 7.

It has been noted that the beneficial effects of the novel heat-exchanging optical bench disclosed in this application are most apparent at higher fluid velocities. For example, liquid flow rates of only 0.35 cc. per minute in the 0.04 inch tube of FIGS. 6–8 did not seem to require special heat-exchanger design. Normally, such low flow rates do not require any heat exchanger if the temperature of the fluid is not extraordinarily high or low.

It should be understood that the discovery that a much shorter heat-exchange path can be used to thermally condition the sample liquid has permitted a considerable flexibility in design of the refractometer. A tubing of given diameter can now be used to handle sample fluid flow rates of about a magnitude greater than could formerly be obtained with the same tubing and heat exchange efficiency because a shorter tube can be used. When the peak spreading is the dominant problem in a particular application, some or all of that decreased pressure drop or increased flow rate may be sacrificed by going to smaller tubing, thereby, to achieve a more favorable peak resolution.

In this connection, it should be understood that, while it is desirable to avoid turbulent flow in a refractometer, it is also desirable to avoid an excessive sample liquid volume in the inlet tube. Smaller tubing volume decreases the peak spread. In this connection, it may be seen that the use of shorter or smaller diameter tubing in a given application provides a reduced peak spreading. A shorter tube length permits a smaller tube diameter for the same pressure drop and hence, a reduced peak spreading.

I has been found that all of the advantages of the instant invention can be achieved with sample inlet tubes of less than 12 inches in length. Tube diameters of less than 0.02 inch are favored because their low liquid capacity allows favorable peak resolutions. That is to say, they can be used to obtain peak widths definitive to less than 100 microliters of sample liquid when the liquid is supplied to a refractometer cell at 1 cc. per minute. The tubing should be so arranged in the massive metallic optical bench that the sensitivity of the apparatus to shock cooling of the incoming fluid is only one-twentieth or less the sensitivty experienced when only ½ inch of tubing is used.

For best operation, the heat conduction to ambient from the massive metallic block is such that the block will be at least 5° C. above the environment when a heat source of one watt is contained within the block.

It is to be understood that the following claims are intended to cover all of the generic and specific features of the invention herein described.

What is claimed is:

1. A differential refractometer comprising an optical bench consisting of a massive metallic block; a recess defined by said block; each of a light source, light-refracting means and light-sensing means mounted within said recess; and a conduit within said block, said conduit forming means to transport sample liquid to said refracting means, wherein each preceding increment of said conduit is substantially thermally isolated by metal of said block, from each succeeding increment, said thermal isolating being at least as great as that between succeeding increments of said conduit, at least one inch in length and arranged at an angle of 60° with respect to one another within said block, when said conduit is up to 0.04-inch diameter.

2. A refractometer as defined in claim 1 wherein said block is formed of a single aluminum block, weighs at least about 10 pounds, and is, in its longest dimension, at least about five inches long.

3. A refractometer as defined in claim 1 wherein said refractometer is of the image-displacement type.

4. A differential refractometer of the kind described in claim 1 wherein said light source is an elongated single-filament light source and the light path from said filament to said refracting means is free of intermediate image-defining means.

5. A refractometer defined in claim 4 wherein said single filament lamp is characterized by a power output of up to about two watts.

6. A refractometer as defined in claim 4 wherein said sample inlet conduit is less than 12 inches long and has an inside diameter of less than about 0.04 inch.

7. A refractometer tube as defined in claim 4 wherein said sample inlet conduit is less than 12 inches long and has an inside diameter of less than about 0.04 inch.

8. A refractometer tube as defined in claim 7 wherein said sample inlet conduit has an inside diameter of less than about 0.02 inch.

9. In a process for operating a differential refractometer of the type comprising a light source, refracting cell and light-sensing means, and wherein a liquid to be analyzed is temperature-conditioned by being passed through a metallic block prior to entry into said refracting cell, the improvement comprising the steps of maintaining linearly sequential portions of the liquid flowing through said metallic block sufficiently separated by metal of said block so that succeeding portions of said liquid are thermally isolated by said metallic block from preceding portions of said liquid, thereby avoiding heat from one portion of said liquid having any substantial thermal effect on a succeeding or preceding portion of said liquid.

10. A process as defined in claim 9 wherein heat output from said light source is maintained at less than about two watts and said light source is defined by the shape of an illuminated filament therein.

11. In a differential refractometer, the improvement wherein a refraction cell adapted to receive the sample liquid, a light source of less than two watts, light-refracting means and light-sensing means are all contained in a massive metallic block having a thermal capacitance equivalent to at least five pounds of aluminum, and further comprising insulation means between said block and the enviroment to provide that said mass is so isolated from ambient thermal conditions that a one watt source of heat contained within said mass will elevate the temperature of the block at least 5° C. above the environmental temperature.

12. A differential refractometer comprising an optical bench consisting of a massive metallic block; a recess defined by said block; each of a light source, light-refracting means and light-sensing means mounted within said recess; and a conduit within said block, said conduit consisting essentially of a series of increments forming means to transport sample liquid to said refracting means and wherein each preceding increment of said conduit is substantially thermally isolated by metal of said block, from each succeeding increment, succeeding increments of said conduit being at least one inch in length and ararnged at an angle of 60° to 180° with respect to one another within said block, when said conduit is up to about 0.04-inch in diameter.

13. A differential refractometer as defined in claim 12 wherein said conduit is less than 12 inches in length.

14. A differential refractometer as defined in calim 13 wherein said conduit has an inside diameter of less than 0.02 inch.

15. A differential refractometer as defined in claim 12 wherein said block is formed of a single aluminum block weighs at least 10 lbs., and is, in its longest dimension, at least about five inches long.

16. A differential refractometer as defined in claim 12 which is of the image displacement type, and wherein said light source is a single filament source characterized by a power output of less than about two watts, directly incident on a refracting means without intermediate image-defining means.

17. Apparatus as defined in claim 16, wherein said refraction cell is contained within a massive metallic block having a thermal capacitance equivalent to at least five pounds of aluminum, and comprising insulation means to provide that said mass is so isolated from ambient thermal conditions that a one watt source of heat contained within said mass will elevate the temperature of the block at least 5° C. above the environmental temperature.

References Cited
UNITED STATES PATENTS

| | | | |
|---|---|---|---|
| 2,706,253 | 4/1955 | Hutchins et al. | 356—51 X |
| 2,802,109 | 8/1957 | Waters | 356—130 X |
| 2,857,799 | 10/1958 | Miller et al. | 356—130 |
| 3,520,620 | 7/1970 | Broerman | 356—131 |

FOREIGN PATENTS

| | | | |
|---|---|---|---|
| 951,473 | 3/1964 | Great Britain | 356—131 |

RONALD L. WIBERT, Primary Examiner

C. CLARK, Assistant Examiner